Dec. 28, 1937.  A. W. CONLEY  2,103,844

AIR CONDITIONING DEVICE

Filed Dec. 23, 1935

INVENTOR.
A. W. Conley
BY Hull Brockwest
ATTORNEY.

Patented Dec. 28, 1937

2,103,844

UNITED STATES PATENT OFFICE 2,103,844

AIR CONDITIONING DEVICE

Arthur W. Conley, Shaker Heights, Ohio

Application December 23, 1935, Serial No. 55,755

6 Claims. (Cl. 219—39)

This invention relates to an air conditioning device and has for its principal object to provide a portable, inexpensive, inconspicuous and at the same time effective device for circulating and moistening the air in rooms, offices, etc. A more limited object is to provide for accelerating the evaporation of water by providing for maintaining the temperature of a portion thereof at a higher point than the remainder. A still further object is to provide peculiarly effective, simple and inexpensive means for maintaining such difference in temperature.

Figure 1:
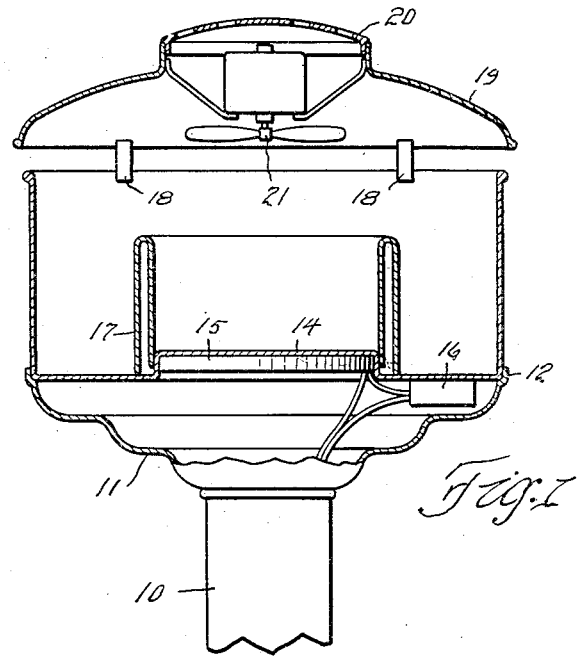
Figure 2:
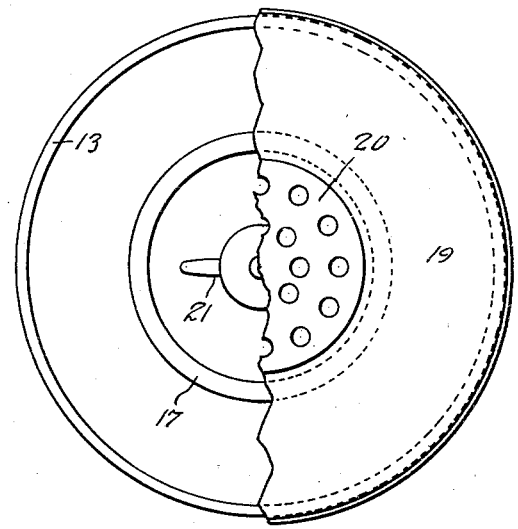

With the foregoing and other objects in view the invention consists in all the novel features, constructions and arrangements of parts herein described and illustrated in the accompanying drawing in which Fig. 1 is a central, vertical sectional view of one embodiment of my invention, and Fig. 2 is a plan view thereof partly in section.

The numeral 10 indicates fragmentarily a pedestal upon which is supported a housing 11 provided with a flange 12 adapted to receive and be secured to a receptacle 13. The receptacle 13 has an upstruck boss 14 arranged centrally of the bottom for reception on the under side thereof of an electric heater 15 controlled by a thermostat 16 responsive to the temperature of water in the receptacle 13. Inasmuch as the system affords numerous small heat leakages to the water adjacent the thermostat 16, it will also control the temperature of the water immediately above the heater 15.

Surrounding the boss 14 is a heat insulating partition 17 comprising inner and outer walls spaced apart and secured together at their upper edges. This partition fits fairly loosely on the boss 14 thus permitting water to seep into the interior when the portion therein has boiled away enough to depress the level materially below that outside.

Supported by any suitable means 18 above the receptacle 13 is a cover element 19 having a perforated central upper portion 20 below which is supported an electric fan 21.

The above described construction results in maintaining a central portion of water at a higher temperature than the outer portion and inducing a current of air downwardly through the element 21 in vapor absorbing relation to the space within the partition 17 and thence outwardly between the elements 13 and 19 in a radial and horizontal current. The fan motor is supplied with electric current by suitable conductors (not shown) connected to a suitable source of supply. The thermostat 16 is connected in series with the heater 15, as shown.

While I have shown and described the present preferred embodiment of my invention, I wish it understood that the same can be embodied in numerous variant forms, and that I am not limited except in accordance with the appended claims and the prior art.

Having thus described my invention, what I claim is:

1. In combination, in an air conditioning device, a receptacle, an upstruck boss in the bottom thereof, a heater in said boss beneath said receptacle, and a heat insulating partition received loosely over said boss whereby water may pass slowly from outside to inside of said partition, said partition comprising spaced concentric walls joined at their tops and spaced apart at their bottom edges and forming a dead air space therebetween.

2. In combination, in an air conditioning device, a receptacle, an upstruck boss in the bottom thereof, a heater in said boss beneath said receptacle, and a heat insulating partition received loosely over said boss whereby water may pass slowly from outside to inside of said partition, said partition comprising spaced walls joined at their tops whereby to form a dead air space.

3. In combination, in an air conditioning device, a receptacle, an upstruck boss in the bottom thereof, a heater in said boss beneath said receptacle, and a heat insulating partition received loosely over said boss whereby water may pass slowly from outside to inside of said partition, and means including a fan for producing a circulation of air from outside said receptacle in vapor absorbing relation to the space within said partition and thence to the outside of said receptacle.

4. In combination, in an air conditioning device, a receptacle, an upstruck boss in the bottom thereof, a heater in said boss beneath said receptacle, and a heat insulating partition received loosely over said boss whereby water may pass slowly from outside to inside of said partition, said partition comprising spaced walls joined at their tops whereby to form a dead air space, and means including a fan for producing a circulation of air from outside said receptacle in vapor absorbing relation to the space within said partition and thence to the outside of said receptacle.

5. In combination, in an air conditioning device, a receptacle, an upstruck boss in the bottom thereof, a heater in said boss beneath said receptacle, and a heat insulating partition received loosely over said boss whereby water may pass slowly from outside to inside of said partition, and means including a fan for inducing a current of air to flow downward from the outside of said receptacle into vapor absorbing relation to the space within said partition and thence radially and horizontally to the outside of said receptacle.

6. In combination, in an air conditioning device, a receptacle, an upstruck boss in the bottom thereof, a heater in said boss beneath said receptacle, and a heat insulating partition received loosely over said boss whereby water may pass slowly from outside to inside of said partition, said partition comprising spaced walls joined at their tops whereby to form a dead air space, and means including a fan for inducing a current of air to flow downward from the outside of said receptacle into vapor absorbing relation to the space within said partition and thence radially and horizontally to the outside of said receptacle.

ARTHUR W. CONLEY.